United States Patent
Tanaka

(10) Patent No.: US 10,571,685 B2
(45) Date of Patent: Feb. 25, 2020

(54) OPTICAL SCANNING CONTROL DEVICE

(71) Applicant: Toyoki Tanaka, Tokyo (JP)

(72) Inventor: Toyoki Tanaka, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/572,227

(22) PCT Filed: Apr. 22, 2016

(86) PCT No.: PCT/JP2016/062824
§ 371 (c)(1),
(2) Date: Nov. 7, 2017

(87) PCT Pub. No.: WO2016/194515
PCT Pub. Date: Dec. 8, 2016

(65) Prior Publication Data
US 2018/0149860 A1  May 31, 2018

(30) Foreign Application Priority Data

May 29, 2015 (JP) ................. 2015-109504

(51) Int. Cl.
G02B 26/08 (2006.01)
G02B 26/10 (2006.01)
(Continued)

(52) U.S. Cl.
CPC .......... *G02B 26/10* (2013.01); *G02B 3/0043* (2013.01); *G02B 3/0056* (2013.01);
(Continued)

(58) Field of Classification Search
CPC .......... G02B 26/10; G02B 3/00; G02B 26/08; G02B 27/01; G02B 27/48; G02B 21/56; G02B 21/62; G03B 21/56; G03B 21/62
(Continued)

(56) References Cited

U.S. PATENT DOCUMENTS 8,988,774 B2 *  3/2015 Matsubara ........... G03B 21/625
                                                      359/453
2004/0130790 A1 *  7/2004 Sales .................... G02B 3/0043
                                                     359/619

(Continued)

FOREIGN PATENT DOCUMENTS

EP      2916149       9/2015
JP   2008-546002    12/2008
(Continued)

OTHER PUBLICATIONS

International Search Report for PCT/JP2016/062824 dated Jul. 12, 2016.
(Continued)

*Primary Examiner* — Euncha P Cherry
(74) *Attorney, Agent, or Firm* — IPUSA, PLLC

(57) ABSTRACT

An optical scanning control device is provided. The optical scanning control device includes a scanning unit configured to scan light emitted from a laser and a screen on which the light scanned by the scanning unit forms an image. A plurality of micro lenses are arranged in an array on a surface of at least one of a light-entering side and a light-exiting side of the screen. The micro lenses are arranged in an array in such a way that the center-to-center distances are randomized in at least one of a first direction and a second direction orthogonal to the first direction.

5 Claims, 11 Drawing Sheets

(51) Int. Cl.
*G02B 27/48* (2006.01)
*G03B 21/62* (2014.01)
*G02B 3/00* (2006.01)
*G02B 27/01* (2006.01)
*G03B 21/56* (2006.01)

(52) U.S. Cl.
CPC .......... *G02B 26/101* (2013.01); *G02B 27/01* (2013.01); *G02B 27/48* (2013.01); *G03B 21/56* (2013.01); *G03B 21/62* (2013.01)

(58) Field of Classification Search
USPC ...................................... 359/201.1
See application file for complete search history.

(56) References Cited

U.S. PATENT DOCUMENTS

2006/0262409 A1 11/2006 Yavid et al.
2014/0133018 A1 5/2014 Matsubara et al.

FOREIGN PATENT DOCUMENTS

| JP | 2012-226303 | 11/2012 |
| JP | 2014-095815 | 5/2014 |
| JP | 2015-057765 | 3/2015 |
| JP | 2015-060092 | 3/2015 |
| JP | 2015-169804 | 9/2015 |
| WO | 2015/022917 | 2/2015 |
| WO | 2015/041196 | 3/2015 |
| WO | 2016/035607 | 3/2016 |
| WO | 2016/052359 | 4/2016 |

OTHER PUBLICATIONS

Extended European search report for European Patent Application No. 16802952.8 dated Dec. 3, 2018.
Tasso R M Sales et al: "Engineered microlens arrays provide new control for display and lighting applications", Photonics Spectra, Jun. 28, 2004, XP055395315, Retrieved from the Internet: URL:http://www.rpcphotonics.com/pdfs/Light Tamers. pdf.
Japanese Office Action for 2015-109504 dated May 28, 2019.
Japanese Office Action for 2015-109504 dated Nov. 12, 2019.

* cited by examiner

FIG.3
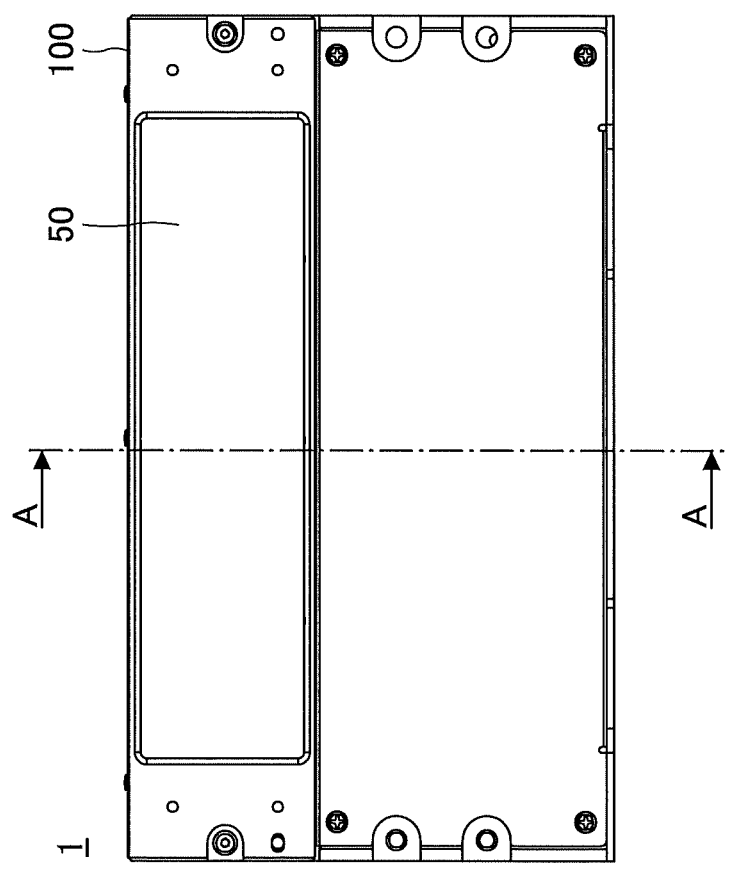
(a)
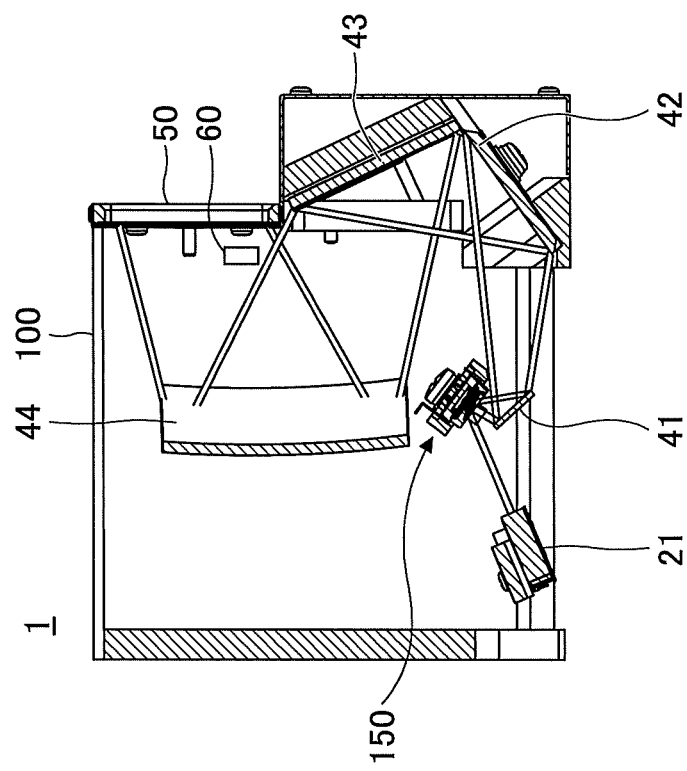
(b)

FIG.5
(a)
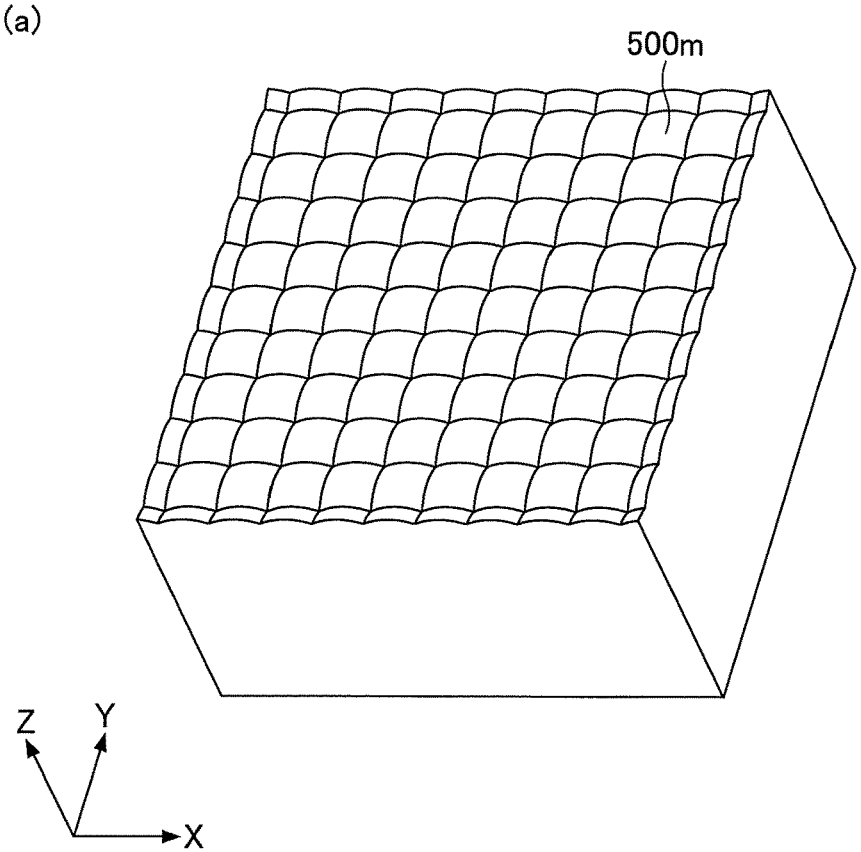
(b)
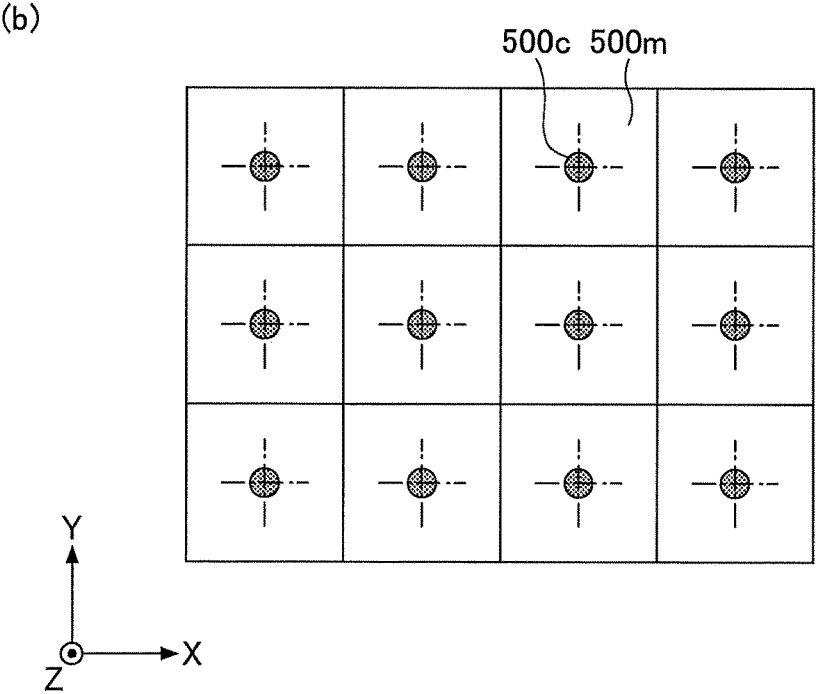

FIG.6
(a)
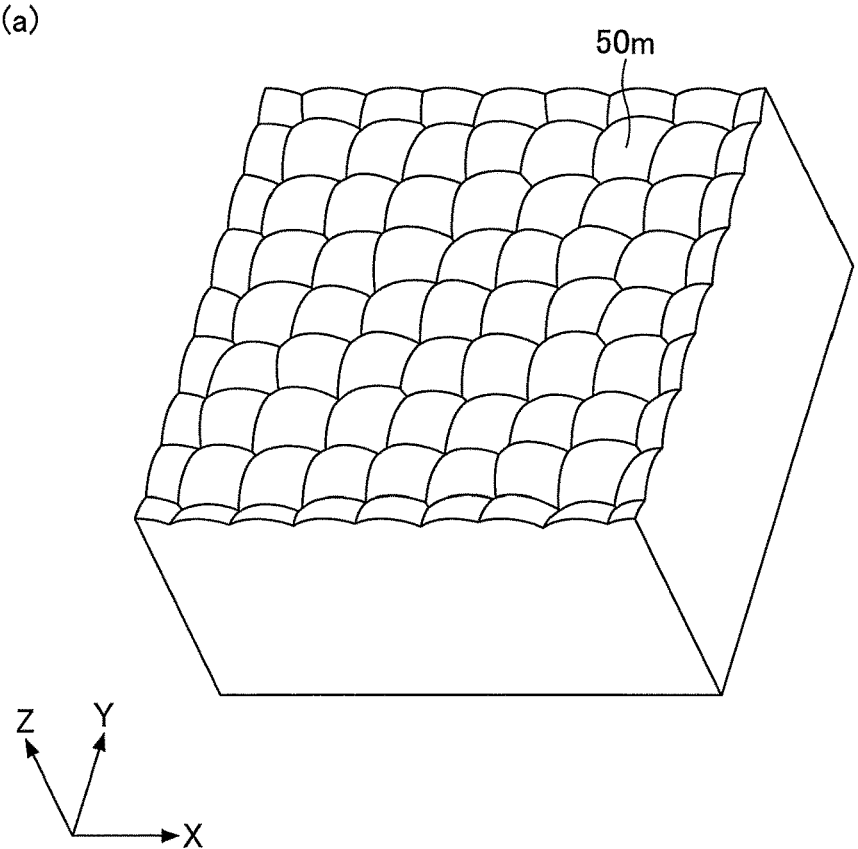
(b)
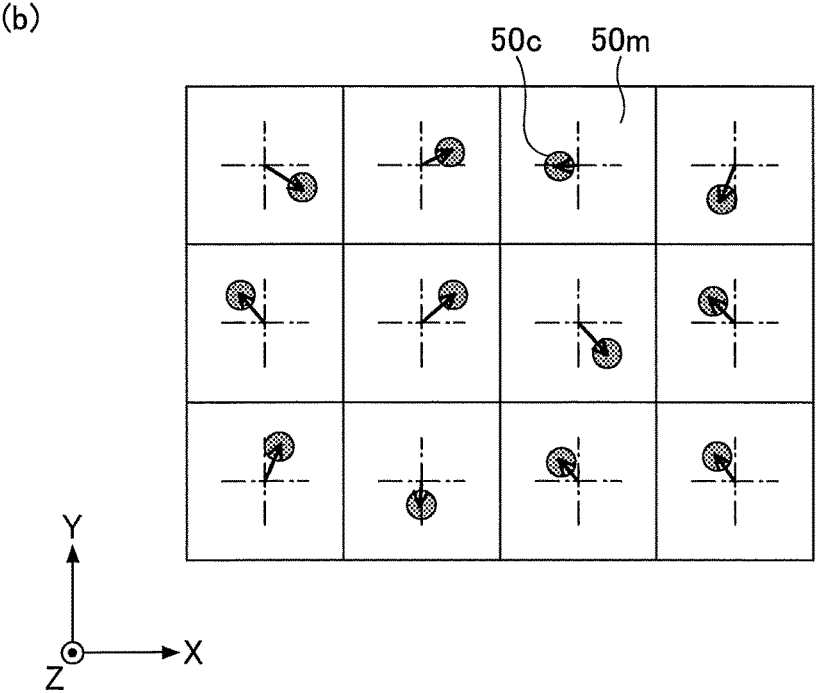

FIG.8
(a)
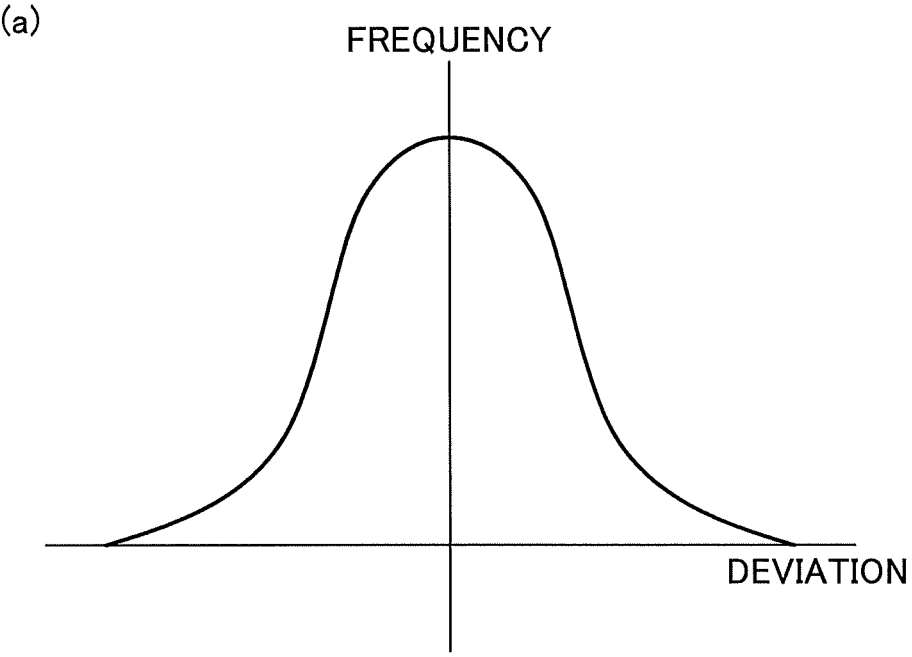
(b)
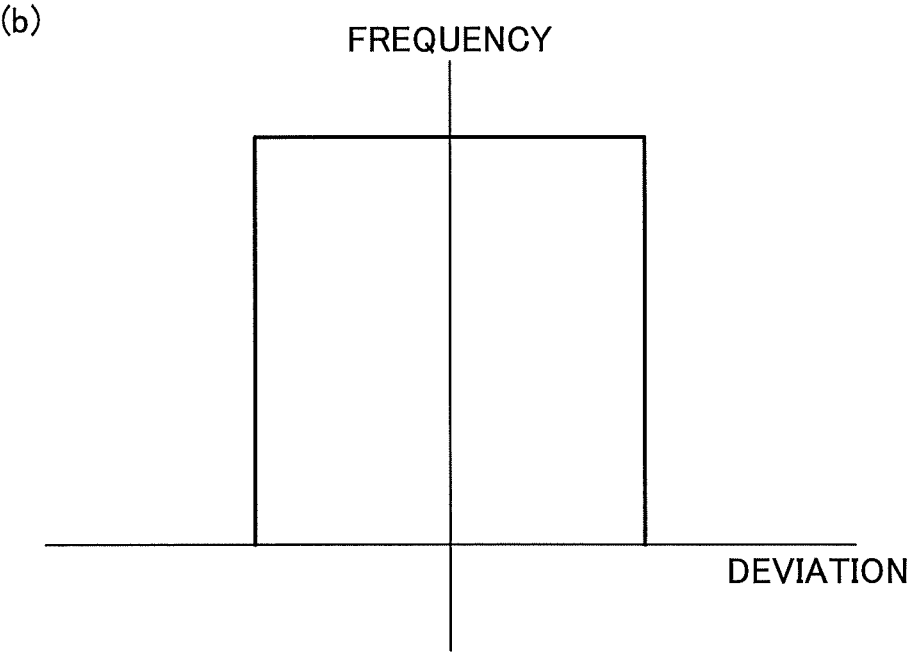

FIG.9
(a)
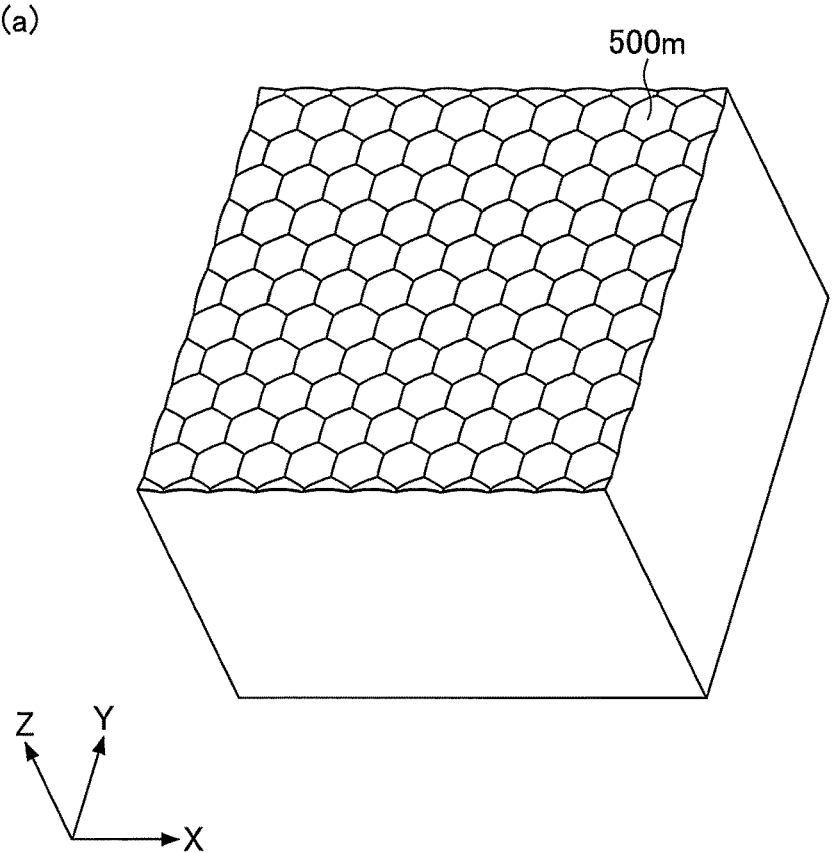
(b)
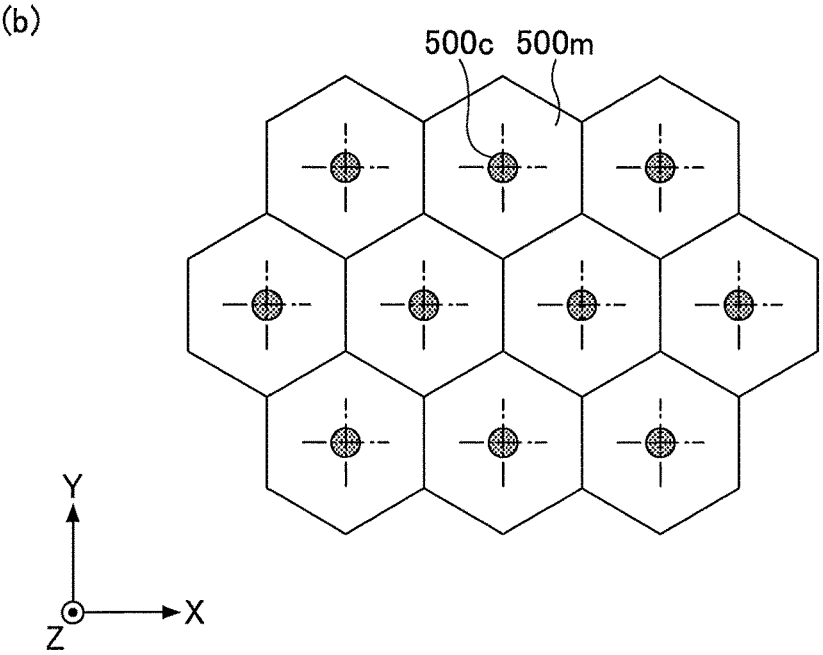

FIG.10
(a)
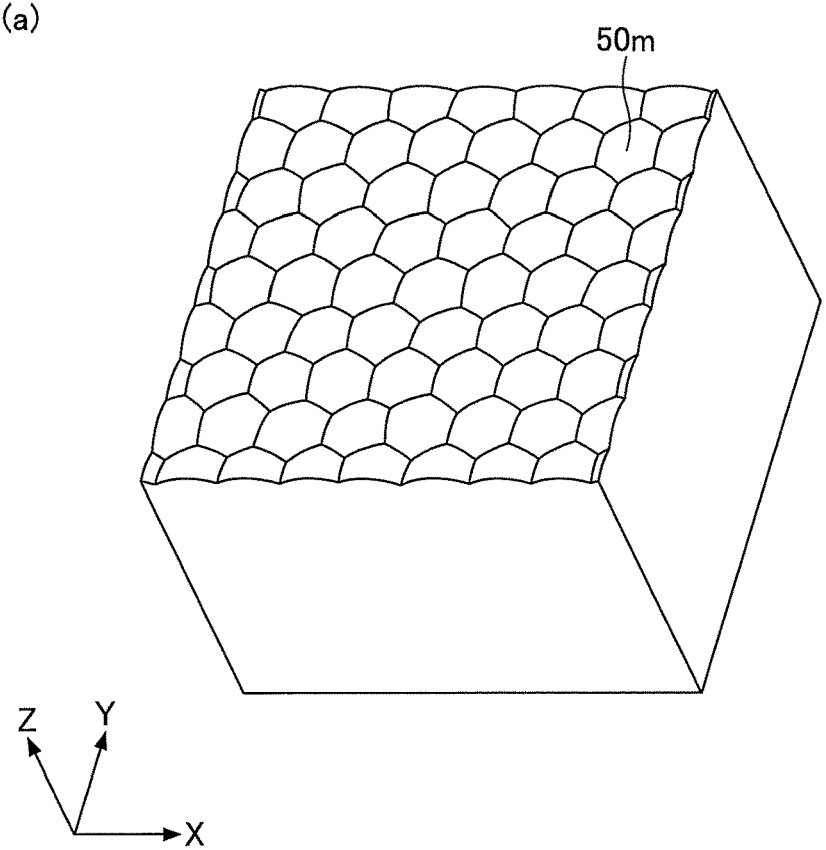
(b)
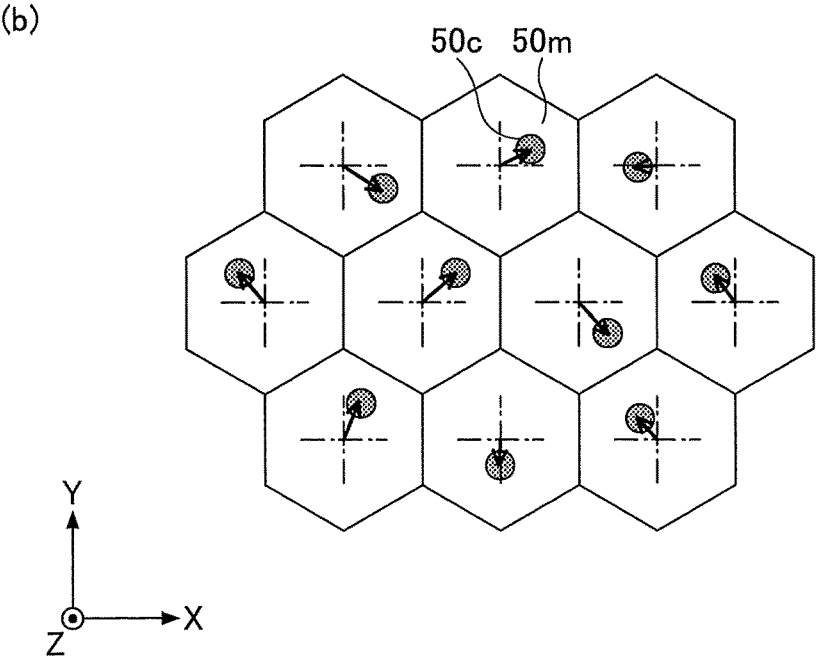

OPTICAL SCANNING CONTROL DEVICE

BACKGROUND OF THE INVENTION

1. Field of the Invention

The present invention relates to an optical scanning control device.

2. Description of the Related Art

An optical scanning control device is known which scans a laser beam to display an image. In this type of optical scanning control device, there is a case in which a micro lens array is used as a screen in order to reduce effects of speckle noise. However, when a micro lens array is used as a screen, there is a case in which an interference pattern is observed due to the regularities of the lens array. In order to prevent the above case, for example, an idea is proposed in which a first micro lens array unit having an array of multiple lenses and a second micro lens array unit having an array of multiple lenses are provided, and a gap between the micro lenses included in the first micro lens array unit is arranged to be narrower than a gap between the micro lenses included in the second micro lens array unit (e.g., refer to Patent Document 1).

However, in the above-described optical scanning control device, there is a problem of increased cost because two micro lens arrays are required.

CITATION LIST

Patent Document

[Patent Document 1] Japanese Unexamined Patent Application Publication No. 2012-226303

SUMMARY OF THE INVENTION

Technical Problem

In view of the above, an object of the present invention is to provide an optical scanning control device enabled to reduce speckle noise and an interference pattern while avoiding the increased cost.

Solution to Problem

According to an embodiment of the present invention, an optical scanning control device (1) includes a scanning unit (310) configured to scan light emitted from a laser (211R, 211G, 211B), and a screen (50) on which the light scanned by the scanning unit (310) forms an image. A plurality of micro lenses (50$m$) are arranged in an array on a surface of at least one of a light-entering side and a light-exiting side of the screen (50). Each of the micro lenses (50$m$) is arranged in an array in such a way that the center-to-center distance is randomized in at least one of a first direction and a second direction orthogonal to the first direction.

It should be noted that reference numerals in the above parentheses are provided in order to facilitate easy understanding, are just examples, and are not limited to aspects illustrated in the drawings.

Advantageous Effects of Invention

According to an embodiment of the present invention, an optical scanning control device is provided which is enabled to reduce speckle noise and an interference pattern while avoiding the increased cost.

BRIEF DESCRIPTION OF THE DRAWINGS

FIG. 3 is an external view (No. 1) illustrating an example of an optical scanning control device according to an embodiment of the present invention.

FIG. 5 is a drawing (No. 1) illustrating an example of a micro lens array according to a comparative example.

FIG. 6 is a drawing (No. 2) illustrating an example of a micro lens array according to an embodiment of the present invention.

FIG. 8 is a drawing illustrating a distribution of deviation amount of coordinates of micro lenses.

FIG. 9 is a drawing (No. 2) illustrating an example of a micro lens array according to a comparative example.

FIG. 10 is a drawing (No. 2) illustrating an example of a micro lens array according to an embodiment of the present invention.

DETAILED DESCRIPTION OF THE PREFERRED EMBODIMENTS

Figure 1:
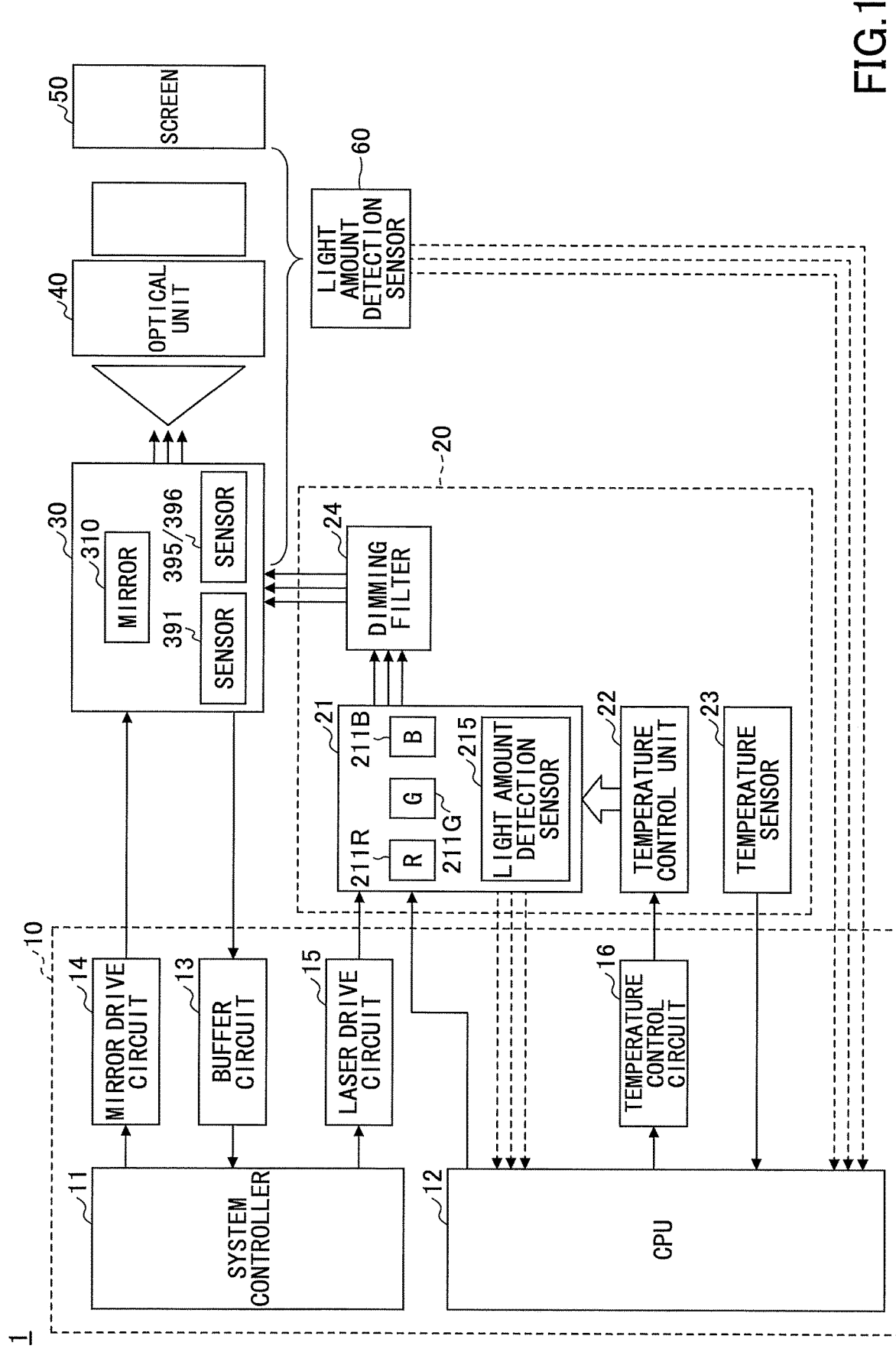
FIG. 1 is a block diagram illustrating an example of an optical scanning control device according to an embodiment of the present invention.

In the following, embodiments of the present invention will be described while making reference to the drawings. Throughout the drawings, a same reference numeral is given to a same element, and duplicated descriptions may be omitted.

Figure 2:
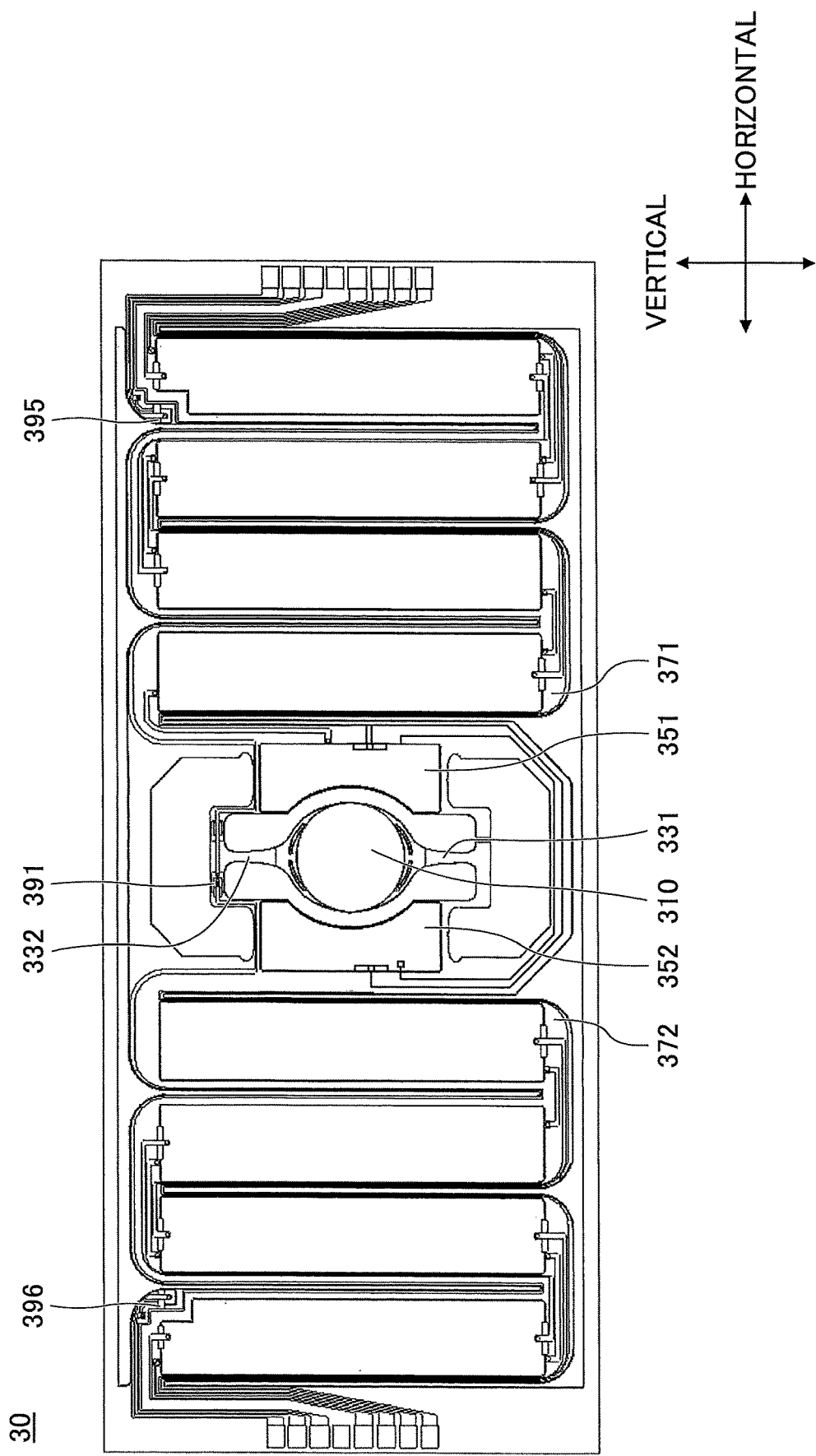
FIG. 2 is a plan view of an optical scanning unit included in the optical scanning control device.
Figure 4:
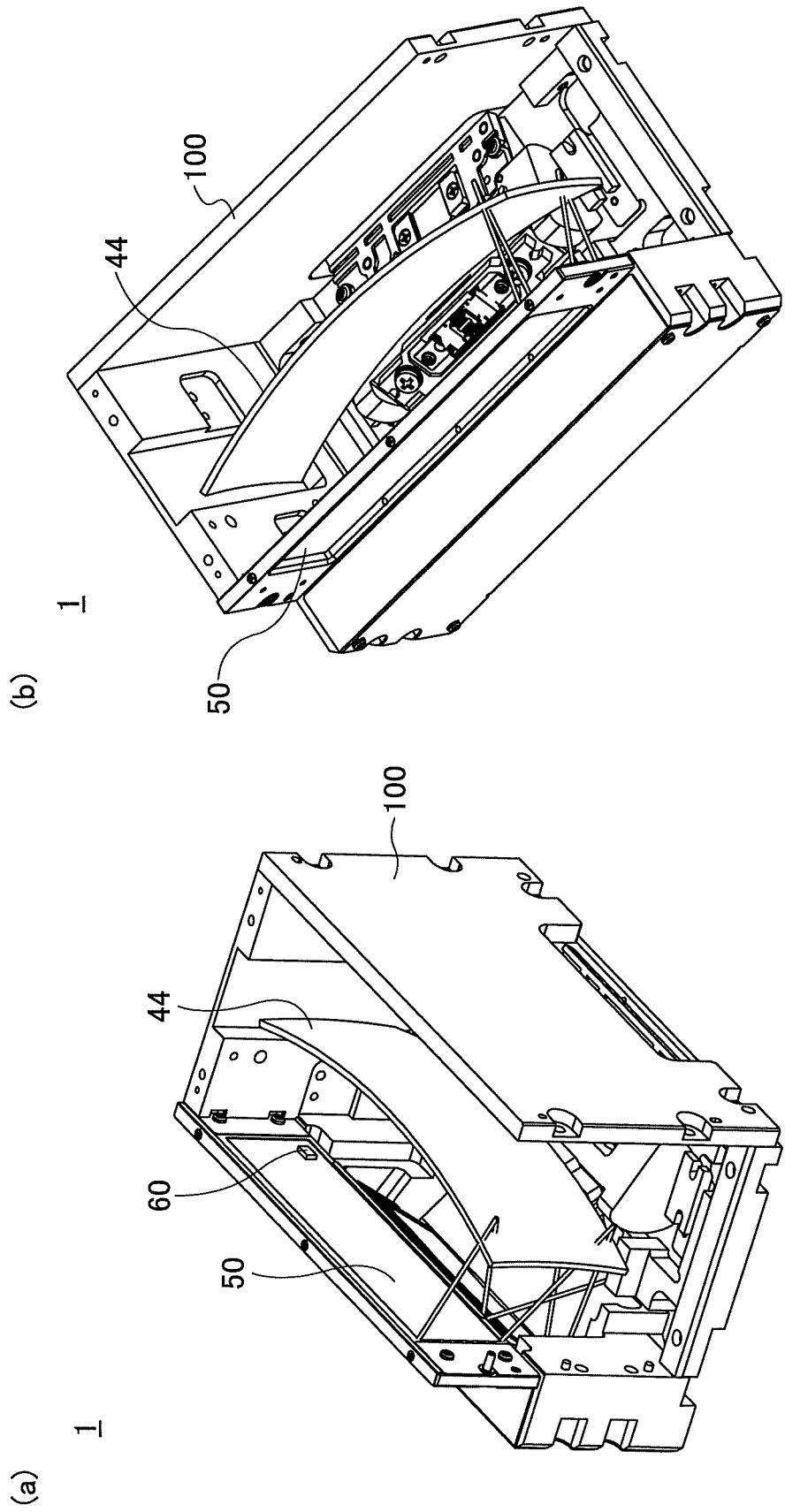
FIG. 4 is an external view (No. 2) illustrating an example of an optical scanning control device according to an embodiment of the present invention.

FIG. 1 is a block diagram illustrating an example of an optical scanning control device 1 according to an embodiment of the present invention. FIG. 2 is a plan view of an optical scanning unit included in the optical scanning control device. FIGS. 3 and 4 are external views illustrating examples of the optical scanning control device 1.

(Overall Structure of Optical Scanning Control Device)

First, referring to FIG. 1 through FIG. 4, an overall structure of the optical scanning control device 1 will be described. The optical scanning control device 1 includes, as main elements, a circuit unit 10, a light source unit 20, an optical scanning unit 30, an optical unit 40, a screen 50, and a light amount detection sensor 60, which are included in a housing 100. The optical scanning control device 1 is, for example, a laser scanning projector.

The circuit unit 10 is a unit for controlling the light source unit 20 and the optical scanning unit 30, and may include, for example, a system controller 11, a CPU (Central Processing Unit) 12, various drive circuits, and the like.

The light source unit 20 includes a LD module 21, a temperature control unit 22, a temperature sensor 23, and a dimming filter 24.

The LD module 21 includes lasers 211R, 211G, and 211B, whose emitted light amounts vary according to an electric current value; an light amount detection sensor 215 that monitors the immediate light amount (immediately after the light is emitted) of each of the lasers 211R, 211G, and 211B; etc. The laser 211R is, for example, a red semiconductor laser, and is capable of emitting light with a wavelength λR (e.g., 640 nm). The laser 211G is, for example, a green semiconductor laser, and is capable of emitting light with a wavelength 2G (e.g., 530 nm). The laser 211B is, for example, a blue semiconductor laser, and is capable of emitting light with a wavelength λB (e.g., 445 nm). As the light amount detection sensor 215, for example, a photodiode, etc., may be used. The light amount detection sensor 215 may be arranged at any position as long as it can detect the light amount before going through the dimming filter 24.

The temperature control unit 22 is capable of controlling the lasers 211R, 211G, and 211B to be a predetermined temperature. The temperature sensor 23 is capable of detecting temperatures of the lasers 211R, 211G, and 211B. As the temperature control unit 22, for example, a Peltier element may be used. As the temperature sensor 23, for example, a thermistor may be used.

The dimming filter 24 is arranged at the front stage of the mirror 310, and the light (mixed light) emitted from the lasers 211R, 211G, and 211B is incident on the dimming filter 24. The dimming filter 24 has a function for adjusting the brightness on the screen 50. As the dimming filter 24, a ND (Neutral Density) filter, a liquid crystal element, a polarization filter, etc., may be used. The dimming filter 24 is arranged in such a way that the dimming filter 24 is tilted with respect to an optical axis of the incident light, and the non-transmitted light (the light that does not go through the dimming filter 24) is absorbed by or reflected by the dimming filter 24.

The optical scanning unit 30 may be, for example, a MEMS (Micro Electro Mechanical System) that drives the mirror 310 by using a piezoelectric element. The mirror 310 functions as a scanning means for forming an image on the screen 50 by reflecting the incident light (mixed light) emitted from the lasers 211R, 211G, and 211B, and scanning the reflected incident light two-dimensionally in the horizontal direction and the vertical direction according to a video signal.

Specifically, as illustrated in FIG. 2, the mirror 310 is supported from both sides by twist beams 331 and 332 that form an axis. In a direction orthogonal to the twist beams 331 and 332, drive beams 351 and 352 are provided as a pair in such a way that the mirror 310 is sandwiched by the drive beams 351 and 352. By using piezoelectric elements formed on respective surfaces of the drive beams 351 and 352, and by using the twist beams 331 and 332 as an axis, it is possible to cause the mirror 310 to oscillate around the axis. Hereinafter, the direction, in which the mirror 310 oscillates around the axis of the twist beams 331 and 332, is referred to as a horizontal direction. Resonance vibration, for example, may be used for the horizontal drive by the drive beams 351 and 352, and may be used for quickly driving the mirror 310. A horizontal displacement sensor 391 is a sensor used for detecting a tilt degree of the mirror 310 in the horizontal direction when the mirror 310 is in a state of oscillating in the horizontal direction.

Further, drive beams 371 and 372 are provided as a pair outside of the drive beams 351 and 352. By using piezoelectric elements formed on respective surfaces of the drive beams 371 and 372, it is possible to cause the mirror 310 to oscillate in a vertical direction orthogonal to the horizontal direction. Vertical displacement sensors 395 and 396 are sensors used for detecting a tilt degree of the mirror 310 in the vertical direction when the mirror 310 is in a state of oscillating in the vertical direction. It should be noted that, for example, in a unit 150 (refer to FIG. 3(b)), the optical scanning unit 30 is mounted on a ceramic package together with a drive circuit, etc., and is covered by a ceramic cover.

The optical unit 40 is an optical system used for projecting light, which has been scanned by the optical scanning unit 30, on the screen 50. For example, as illustrated in FIG. 3(b), etc., the optical unit 40 may include a reflection mirror 41, a reflection mirror 42, a reflection mirror 43, a concave mirror 44, etc. It should be noted that lenses may be used instead of the reflection mirrors if necessary. The light that enters the optical unit 40 from the light scanning unit 30 is caused to be approximately parallel light by the concave mirror 44 so as to form an image on the screen 50. The image in accordance with an image signal is drawn on the screen 50.

The screen 50 is provided with a micro lens array for removing noise on an image, which can be seen as granular referred to as speckle. Each of the micro lenses included in the micro lens array corresponds to a pixel of a display. It is preferable that an emitted laser beam be equal to or less than the size of the micro lenses. The micro lens array included in the screen 50 will be described in detail later.

The light amount detection sensor 60 may be arranged at any position as long as the light amount after going through the dimming filter 24 can be detected. The light amount detection sensor 60 is capable of independently detecting each of the light amounts of the lasers 211R, 211G, and 211B after going through the dimming filter 24. As the light amount detection sensor 60, for example, one or more photodiodes, etc., may be used.

(Overall Operation of Optical Scanning Control Device)

Next, an overall operation of the optical scanning control device 1 will be described. The system controller 11 is capable of, for example, controlling a swing angle of the mirror 310. The system controller 11 is enabled to monitor, for example, tilts of the mirror 310 in the horizontal direction and the vertical direction obtained by the horizontal displacement sensor 391 and the vertical displacement sensors 395 and 396 via a buffer circuit 13, and to supply an angle control signal to a mirror drive circuit 14. Further, based on the angle control signal from the system controller 11, the mirror drive circuit 14 is enabled to drive (for scanning) the mirror 310 for a predetermined angle by supplying predetermined drive signals to the drive beams 351 and 352, and drive beams 371 and 372.

Further, the system controller 11 is enabled to supply, for example, a digital video signal to a laser drive circuit 15. Further, the laser drive circuit 15 supplies predetermined electric currents to the laser 211R, 211G, and 211B based on the video signal from the system controller 11. According to the above operations, it is possible for the lasers 211R, 211G, and 211B to emit red light, green light, and blue light, respectively, which are modulated based on the video signal, and it is possible to form a color image by mixing them.

A CPU 12 is enabled to supply a light amount control signal to the LD module 21 by monitoring originally emitted light amounts of the lasers 211R, 211G, and 211B (immediately after emission of the laser light) based on, for example, an output of the light amount detection sensor 215. Electric currents to the lasers 211R, 211G, and 211B are controlled based on the light amount control signal from the CPU 12 so as to achieve predetermined outputs (light amounts).

It should be noted that the light amount detection sensor 215 may include three sensors for independently detecting the light amounts emitted from the lasers 211R, 211G, and 211B. Alternatively, the light amount detection sensor 215 may include only a single sensor. In this case, it is possible to control the light amounts emitted from the lasers 211R, 211G, and 211B by causing the lasers 211R, 211G, and 211B to sequentially emit light and sequentially detecting the light amount by using the single sensor.

Further, the CPU 12 is enabled to supply a temperature control signal to a temperature control circuit 16 by monitoring temperatures of the lasers 211R, 211G, and 211B based on an output of the temperature sensor 23. Further, the temperature control circuit 16 supplies a predetermined electric current to the temperature control unit 22. According to the above operations, the temperature control unit 22 is heated or cooled, and it is possible to control each laser to be a predetermined temperature.

The light amount detection sensor 60 detects a light amount after going through the dimming filter 24. As described above, the light amount detection sensor 215, which is used for adjusting the light amounts of the lasers, is implemented in the LD module 21, and detects originally emitted light amounts of the lasers 211R, 211G, and 211B (light amounts before going through the dimming filter 24). However, because an actual image displayed by the optical scanning control device 1 is based on the light projected on the screen 50, there may be a case where it is difficult to perform correct adjustment if the adjustment is based on the originally emitted laser light amounts.

For example, because the dimming filter 24 is provided on the light route, there may be a case in which an expected dimming rate is not obtained due to the characteristics of the dimming filter 24, and the light amount after going through the dimming filter 24 is not as expected. Further, in a case where there are variations among the R/G/B dimming rates of the dimming filter 24, there is a risk of collapsed white balance after going through the dimming filter 24. Further, there may be a case in which characteristics of the optical scanning unit 30 fluctuate due to the temperature or the aging. The above-described problems cannot be solved even if the light amount before going through the dimming filter 24 is very precisely controlled by the light amount detection sensor 215 in the optical scanning device 30.

Therefore, in the optical scanning control device 1, as a light amount detection means for detecting the light amount after going through the dimming filter 24, the light amount detection sensor 60 is provided. A detection result of the light amount detection sensor 60 is input to the CPU 12 as a control means. The CPU 12 is enabled to supply a light amount control signal for controlling an electric current value of each laser, to the LD module 21 based on the light amount detected by the light amount detection sensor 60.

According to the above operations, it is possible to detect the light amount of the laser light in which the fluctuations of the characteristics of the dimming filter 24 and the optical scanning unit 30 are taken into account, and thus, it is possible to perform accurate light amount control corresponding to an actual image displayed on the screen 50. It should be noted that the light amount detection sensor 60 is enabled to independently detect each of the light amounts of the lasers 211R, 211G, and 211B, and the CPU 12 is enabled to control an electric current value of each laser based on the corresponding light amount detected by the light amount detection sensor 60.

(Micro Lens Array)

In the following, a micro lens array of the screen 50 will be described in detail. FIG. 5 is a drawing (No. 1) illustrating an example of a micro lens array according to a comparative example (conventional micro lens array). FIG. 5(a) is a perspective view, and FIG. 5(b) is a schematic plan view illustrating a center position of each of the micro lenses. Further, FIG. 6 is a drawing (No. 1) illustrating an example of a micro lens array according to an embodiment of the present invention. FIG. 6(a) is a perspective view, and FIG. 6(b) is a schematic plan view illustrating a center position of each of the micro lenses.

As illustrated in FIG. 5, in the conventional micro lens array, for example, a planar shape of each of the micro lenses 500m is a rectangle, and the centers 500c of the micro lenses 500m are evenly spaced (arranged at regular intervals) in an X direction (lateral or horizontal direction) and in a Y direction (longitudinal or vertical direction) orthogonal to the X direction.

With respect to the above, as illustrated in FIG. 6, in a micro lens array according to an embodiment of the present invention, the centers 50c of the micro lenses 50m are arranged randomly in the X direction and in the Y direction. In other words, the micro lenses 50m are arranged in an array in which the center-to-center distances of the micro lenses 50m are randomized in the X direction and the Y direction (are arranged at different intervals in the X direction and in the Y direction).

In the screen 50, the micro lens array may be formed on any one of the light-entering side surface and the light-exiting side surface of the screen 50. Regardless of whether the micro lens array is formed on the light-entering side surface or the light-exiting side surface, the effects are equivalent, by which the speckle reducing function is maintained and the interference pattern is reduced, which will be described later. However, forming the micro lens array on the light-entering side is preferable in that a smooth image can be observed from the light-exiting side. It should be noted that similar effects will be obtained in a case where the micro lens arrays are formed on both sides (the light-entering side surface and the light-exiting side surface), and a micro lens array formed on at least one of the surfaces is arranged in a random manner.

In each of the micro lenses 50m in FIG. 6(b), an intersection of crosshairs indicates a position of the center 500c in FIG. 5(b), and an arrow indicates a direction in which the center 50c deviates from the center 500c in FIG. 5(b).

It should be noted that the curvature of each of the micro lenses 50m may be either a spherical shape or an aspherical shape. In any case, the thickness and the curvature radius of the micro lenses 50m are unified. According to the unification described above, it is possible to cause the focal length of each of the micro lenses 50m to be the same.

Figure 7:
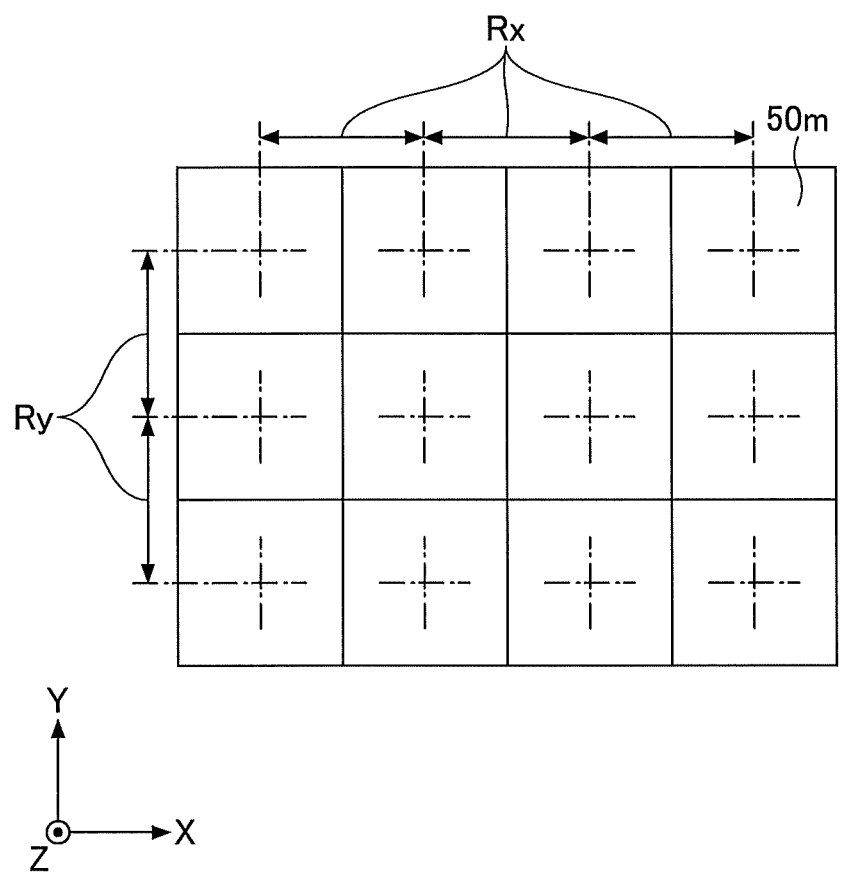
FIG. 7 is a drawing (No. 1) illustrating a reference distance.

Next, a method of arranging the centers 50c of the micro lenses 50m with randomness will be described. FIG. 7 is a drawing (No. 1) illustrating a reference distance, and is a schematic plan view illustrating an example of the micro lens array.

In each of the micro lenses 50m in FIG. 7, an intersection of crosshairs indicates a position in a case where the centers of the micro lenses 50m were evenly spaced (arranged at regular intervals) in the X direction and in the Y direction. At this time, a center-to-center distance in the X direction between the adjacent micro lenses 50m is referred to as a reference distance Rx, and a center-to-center distance in the Y direction between the adjacent micro lenses 50m is referred to as a reference distance Ry. The reference distance Rx and the reference distance Ry may be appropriately determined according to the specification requirement. The reference distance Rx and the reference distance Ry may be, for example, about several tens to several hundred μm.

Here, it is assumed that there are as many as N micro lenses 50m, and center coordinates in a case where the centers of the micro lenses 50m were evenly spaced (arranged at regular intervals) are (x1, y1), (x2, y2), (x3, y3), . . . , (xn, yn). At this time, the micro lenses 50m would be arranged at every reference distance Rx and reference distance Ry, which is referred to as a standard size of the micro lenses 50m. The reference distance Rx may be the same as or different from the reference distance Ry.

Next, when it is assumed that deviations of the coordinates of the micro lenses 50m with respect to the above-described center coordinates are (Δx1, Δy1), (Δx2, Δy2), (Δx3, Δy3), . . . , (Δxn, Δyn), the center coordinates of the micro lenses 50m are as shown in Table 1.

TABLE 1

| LENS No. | X-COORDINATE | Y-COORDINATE |
|---|---|---|
| 1 | x1 + Δx1 | y1 + Δy1 |
| 2 | x2 + Δx2 | y2 + Δy2 |
| 3 | x3 + Δx3 | y3 + Δy3 |
| 4 | x4 + Δx4 | y4 + Δy4 |
| — | — | — |
| — | — | — |
| — | — | — |
| n | xn + Δxn | yn + Δyn |

Here, the deviations (Δxi, Δyi) (i=1 to n) are random numerical values defined by using random numbers. The distribution of the deviation amounts may include positive and negative values with 0 (zero) being the center. It is preferable that the positive distribution rate (distribution rate of the positive values) and the negative distribution rate (distribution rate of the negative values) be the same. In other words, it is preferable that the positive distribution rate and the negative distribution rate of the deviation amounts of the center-to-center distances of the micro lenses 50m with respect to the reference distance Rx and the reference distance Ry be the same. With respect to the above, it is possible to realize such a distribution by applying a normal distribution illustrated in FIG. 8(a), or a uniform distribution illustrated in FIG. 8(b).

By causing the positive and negative distribution rates of the deviation amounts to be the same, an average size of the micro lenses 50m will be approximately the same as the reference distance Rx and the reference distance RY. Therefore, a diffusion angle of the screen 50 can be obtained based on a numerical aperture (NA) of the lens that is determined by the reference distance Rx and the reference distance Ry.

It should be noted that, according to the study of the inventors, it is preferable that the deviation amounts be equal to or less than 30% with respect to the reference distance Rx and the reference distance Ry. In other words, it is preferable that Δx/Rx=<30%, Δy/Ry=<30%. According to the above arrangement, it is possible to reduce the interference pattern while maintaining the speckle reduction function.

It should be noted that, referring to FIG. 5 to FIG. 7, a case has been described in which the planar shape of the micro lenses is a rectangle (a case of rectangular pattern in which the lenses are arranged in a square shape). The present invention is not limited to this. For example, the planar shape of the micro lenses may be a hexagon (triangular pattern in which the micro lenses are arranged in a honeycomb shape), or a planar shape other than the above.

Figure 11:
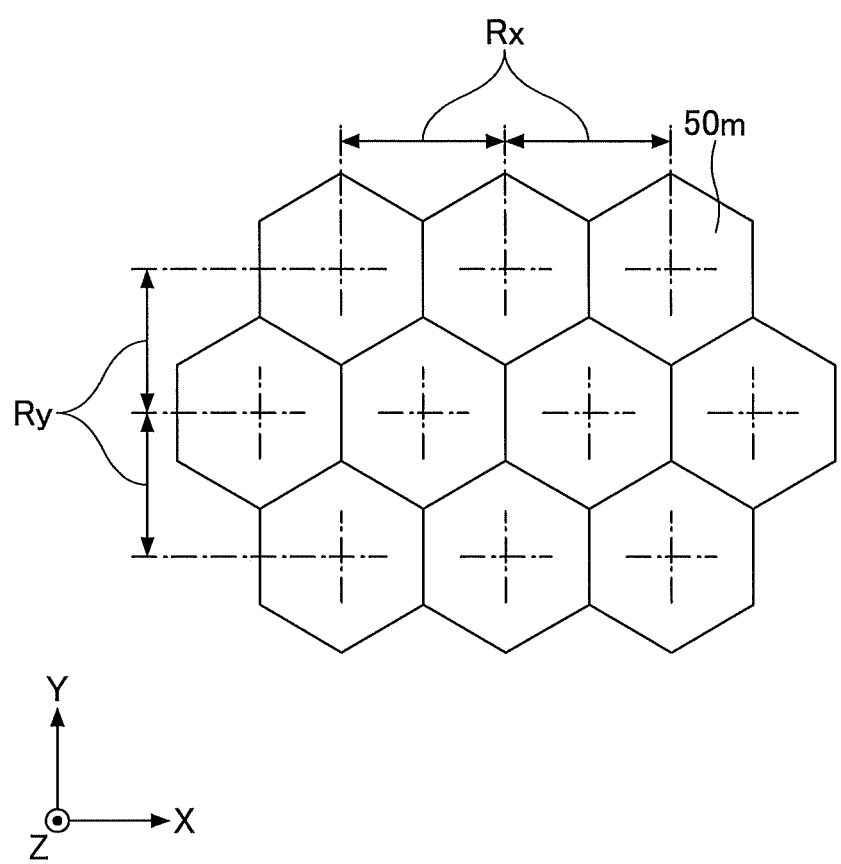
FIG. 11 is a drawing (No. 2) illustrating a reference distance.

Cases in which the planar shape of the micro lenses is a hexagon is illustrated in FIG. 9 to FIG. 10. FIG. 9 is a drawing (No. 2) illustrating an example of a micro lens array according to a comparative example (conventional micro lens array). FIG. 9(a) is a perspective view, and FIG. 9(b) is a schematic plan view illustrating a center position of each of the micro lenses. Further, FIG. 10 is a drawing (No. 2) illustrating an example of a micro lens array according to an embodiment of the present invention. FIG. 10(a) is a perspective view, and FIG. 10(b) is a schematic plan view illustrating a center position of each of the micro lenses. FIG. 11 is a drawing (No. 2) illustrating a reference distance, and is a schematic plan view illustrating an example of the micro lens array.

In a case where the planar shape of the micro lenses 500m is a hexagon, by using a similar method as used in the case where the planar shape of the micro lenses 500m is a rectangle, it is possible to arrange the centers 50c of the micro lenses 50m with randomness in the X direction and in the Y direction. Regarding the point that it is preferable that the distribution of the deviation amounts be a normal distribution or a uniform distribution, and regarding the point that it is preferable that the deviation amounts be equal to or less than 30% with respect to the reference distance Rx and the reference distance Ry (i.e., it is preferable that Δx/Rx=<30%, Δy/Ry=<30%), the same things can be applied to the hexagon case.

As described above, by implementing the screen 50 using a micro lens array including the micro lenses 50m and by arranging the centers 50c of the micro lenses 50m with randomness in the X direction and in the Y direction, it become possible to reduce the interference pattern while maintaining the speckle reduction function. It should be noted that even when the centers 50c of the micro lenses 50m are arranged with randomness in only one of the X direction and the Y direction, it is still possible to reduce the interference pattern while maintaining the speckle reduction function.

It should be noted that it is preferable that a spot diameter (FWHM: full width at half maximum) of the light beam emitted onto the screen 50 be less than the reference distance Rx and the reference distance Ry. This is because, when the spot diameter of the light beam emitted onto the screen 50 is greater than the reference distance Rx and the reference distance Ry, it is more likely that the light beam is emitted onto an area including multiple micro lenses 50m, and thus, it is more likely that the interference pattern is generated.

It should be noted that the above described embodiments are preferable embodiments of the present invention. However, the present invention is not limited to the above embodiments, and various modifications may be possible within a range without departing from the spirit of the present invention.

For example, in the above embodiments, an example is illustrated in which an optical scanning control device according to an embodiment of the present invention is applied to a laser scanning projector. However, an optical scanning control device according to an embodiment of the present invention is not limited to the above example. An optical scanning control device according to an embodiment of the present invention may be applied to various devices that display an image on a screen. For example, an in-vehicle head-up display, a laser printer, a laser scanning depilator, a laser head lamp, a laser radar, etc., may be listed as such devices.

It should be noted that, by using the screen of the optical scanning control device according to an embodiment of the present invention as an intermediate screen, and by indirectly projecting images on the windshield or a combiner, it is possible to build an in-vehicle head-up display capable of reducing the speckle noise and the interference pattern.

Further, in an embodiment of the present invention, an example is illustrated in which three lasers are included. However, at least one laser may be included. In this case, a single color optical scanning control device may be realized.

The present application is based on and claims the benefit of priority of Japanese Priority Application No. 2015-109504 filed on May 29, 2015, the entire contents of which are hereby incorporated herein by reference.

DESCRIPTION OF THE REFERENCE NUMERALS 1 optical scanning control device
10 circuit unit
11 system controller
12 CPU
13 buffer circuit
14 mirror drive circuit
15 laser drive circuit
16 temperature control circuit
20 light source unit
21 LD module
22 temperature control unit
23 temperature sensor
24 dimming filter
30 optical scanning unit
40 optical unit
41, 42, 43 reflection mirror
44 concave mirror
50 screen
50m micro lens
50c center of micro lens
60 light amount detection sensor
100 housing
150 unit
211R, 211G, 211B laser
215 light amount detection sensor
310 mirror
351, 352, 371, 372 drive beam
391 horizontal displacement sensor
395, 396 vertical displacement sensor

What is claimed is:

1. An optical scanning control device comprising:
   a scanning unit configured to scan light emitted from a laser; and
   a screen on which the light scanned by the scanning unit forms an image, wherein
   a plurality of micro lenses are arranged in an array on a surface of at least one of a light-entering side and a light-exiting side of the screen, and the micro lenses are arranged in the array in such a way that center-to-center distances of the micro lenses are aperiodically arranged at different intervals in at least one of a first direction and a second direction orthogonal to the first direction, and wherein
   deviation amounts of the center-to-center distances of the micro lenses are equal to or less than 30% with respect to a reference distance, the reference distance being the center-to-center distance of the micro lenses arranged at regular intervals.

2. The optical scanning control device according to claim 1, wherein a positive distribution rate of the deviation amounts of the center-to-center distances of the micro lenses with respect to a reference distance and a negative distribution rate of the deviation amounts are the same.

3. The optical scanning control device according to claim 1, wherein a spot diameter of a laser beam emitted onto the screen is less than a reference distance, the reference distance being the center-to-center distance of the micro lenses arranged at regular intervals.

4. The optical scanning control device according to claim 1, wherein a thickness and a curvature radius of each of the micro lenses are substantially same.

5. The optical scanning control device according to claim 1, wherein, the micro lenses are arranged in an array on a surface of the light-entering side of the screen.

* * * * *